Patented Feb. 1, 1938

2,107,062

UNITED STATES PATENT OFFICE 2,107,062

HYDROXYLATED FISH OIL FATTY ACIDS AND PROCESSES OF PREPARING THE SAME

Anderson W. Ralston and Stewart T. Bauer, Chicago, Ill., assignors to Armour and Company, Chicago, Ill., a corporation of Illinois No Drawing. Application March 17, 1936, Serial No. 69,411

13 Claims. (Cl. 260—112)

This invention relates to hydroxylated fish oil fatty acids and processes of preparing the same, and it comprises as new materials hydrogenated, hydroxylated fish oil fatty acids, it further comprises unsaturated, partially hydroxylated fatty acids derived from fish oils, and it further comprises processes of preparing such hydroxylated fatty acids wherein a highly unsaturated fish oil or fish oil fatty acid, is partially hydrogenated, and the hydrogenated fatty acids thereof treated with reagents which will hydroxylate the acids.

The fish oils, such as those derived from menhaden, herring, sardine, salmon, and whale by the usual rendering processes have been used in the arts for many different purposes. However, their properties are such that they cannot be used in many relations where their relative cheapness would make them desirable. For example, fish oils, when saponified, will not yield soaps which are at all satisfactory. While the foaming properties of soaps made from the original fish oils are satisfactory, the soaps are too soft and in addition possess a characteristic odor which it is necessary to remove by hydrogenation. But since hydrogenation is attended by decreased foaming properties there has hitherto been no known process entirely satisfactory for the incorporation of large amounts of fish oil in soap stocks. This greatly reduces the potential value of fish oils as soap stocks in spite of the fact that they are extremely abundant at prices considerably below other oils.

The difference between fish oil fatty acids and vegetable oil fatty acids is that the fish oil fatty acids are much more highly unsaturated and also that conjugated unsaturation is seldom encountered in these acids. Also fish oils contain a large amount of acids containing more than 18 carbon atoms in the chain, which fact differentiates them from the usual occurring animal and vegetable fats. One of the acids occurring frequently in fish oils is clupanodonic, to which the formula $C_{18}H_{28}O_2$ has been given. This acid is highly unsaturated and the peculiar odors characteristic of fish oils are due largely to its presence. One might assume that this acid, in view of its high degree of unsaturation, would be a drying oil acid and would have good drying properties, but such is not the case and the reason has been ascribed to the fact that the double bonds are not in the same position relative to each other. It is therefore evident that one cannot predict the behavior of unsaturated fatty acids from their degree of unsaturation alone, since the position of the double bonds has marked influence upon this behavior.

There are many other unsaturated fatty acids in fish oil. Frequently these acids have molecular weights considerably higher than those of clupanodonic acid. For example, the number of carbon atoms in the molecule will be as much as 22 or even higher.

As stated, the fatty acids of fish oil, while they are used to a large extent in the arts, chiefly after hydrogenation thereof, have not reached the economic importance to which they are justly entitled in view of the relative cheapness of them. Accordingly we have set ourselves to the problem of developing ways of enlarging the usefulness of these fish oil fatty acids, and we have discovered that they can be so modified chemically as to give materials which have lost all objectionable odor normally associated with fish oils, and have gained physical and chemical properties which permit them to be used in the soap industry and in many other relations. In fact, certain of the modified fish oil fatty acids which we have prepared by the processes of the present invention have, in soap form, foaming properties superior to ordinary sodium soaps of vegetable fatty acids, and superior to soaps from so-called "hardened" "marine oils".

Our invention is predicated in part upon the discovery that, upon hydroxylation, the fatty acids of fish oil undergo marked change in physical and chemical properties. Our invention is also predicated upon the discovery that before hydroxylating such acids it is desirable to partially hydrogenate the acids. In our invention we do not ordinarily obtain as final products fatty acids which are fully saturated. Practically all of the products of the present invention can be defined as partially hydroxylated fatty acids, although we believe ourselves to be the first to hydroxylate fish oil fatty acids to any extent whatever. In some instances we hydroxylate an unsaturated fatty acid derived from fish oil with no appreciable change in the iodine number of the fatty acid. For example, we have discovered that one of the very best products for use in soaps is one in which the iodine number of the fish oil fatty acid before and after hydroxylation remains substantially unchanged. In this case we are confident that unusual chemical reactions occur during the hydroxylation of the acid. Normally, hydroxylation reduces the iodine number but in this specific case we believe that hydroxylation is followed by a splitting out of water from the molecule whereby unsaturation is restored. We will describe this feature in greater detail presently.

In broad aspects then, our process comprises the steps of hydrogenating a fish oil, or fish oil fatty acids, to reduce the unsaturation thereof somewhat but not completely, followed by hydroxylation of the resulting hydrogenated fatty acid. We ordinarily find it better to hydrogenate the fish oil itself rather than its fatty acids per se. Fish oil is, of course, a triglyceride and in the hydrogenation thereof we employ the usual methods for hydrogenating materials of this type. As is well known, fats are somewhat more readily hydrogenated than fatty acids and that is why we prefer to hydrogenate the fish oil itself. We can, however, split or hydrolyze the fish oil, recover the free fatty acid and hydrogenate this, also in accordance with hydrogenation procedure which has been developed for the hydrogenation of fatty acids.

Thus, for example, we can start with a fish oil having an iodine number of 147 and reduce the iodine number by hydrogenation to about 78.8. This gives us a partially hydrogenated fish oil which has lost some of its undesirable odor but the free acids of which will not form satisfactory soaps. We then convert the partially hydrogenated fatty acids thereof to hydroxylated fatty acids. Here again we can proceed in either of two ways. We can subject the partially hydrogenated fish oil itself to reagents which will add hydroxyl groups to the molecule, and then saponify the hydroxylated material to form the free fatty acids, or soaps thereof. Or we can split, saponify, or hydrolyze the partially hydrogenated fish oil, recover its content of fatty acids, and then hydroxylate the fatty acids. We find that the latter method is superior to the first method described. In other words, it is somewhat easier to hydroxylate a fatty acid rather than a triglyceride but much, of course, depends upon the method used for hydroxylation. In our preferred method of hydroxylation we use the processes described in our copending Patent 2,033,538. This method comprises the steps of treating the unsaturated fatty acid with an aqueous solution of an alkali metal hypochlorite in the presence of a hypochlorite decomposing agent which functions to liberate oxygen from the hypochlorite. Other methods such as that based on the use of potassium permanganate and strong alkalis are also suitable, and we do not wish to be restricted to any particular method. But of the various processes we find that that described in our copending patent is most advantageous in that high yields with an entire absence of by-products is obtained coupled with relatively low reagent cost.

We shall now describe our invention in more specific detail and, in order to keep the description within reasonable bounds we will restrict it more specifically to the conversion of fish oils from menhaden. It is to be understood, however, that our invention is applicable to all fish oils and fish oil fatty acids and that we can make our hydroxylated products from a variety of fish oil sources. Virtually all of the fish oils we use have iodine numbers of at least 100. Herring oil has an iodine number of about 103 to 142, whale from 110 to 146, shark from 146 to 152, salmon around 160 to 165, sardine from 161 to 192 and menhaden from 139 to 172. These fish oils are the more common ones and we can prepare our products from any of them in accordance with the methods to be described.

As stated, we first partially hydrogenate the fish oil. When starting with a menhaden oil having an iodine number of about 147 we first subject the oil to the action of hydrogen gas in the presence of a nickel catalyst and at elevated temperatures. Usually the hydrogenation temperature is about 150° C., although it can range up to about 250° C. The pressure can vary from slightly above atmospheric up to forty pounds per square inch or more in accordance with the usual procedure in this art. The hydrogenation pressure is not critical and should be sufficient to force the hydrogen gas through the fish oil. We lay no claim to any unique method of hydrogenating fish oils but simply use the common hydrogenation processes hitherto employed for either fully or partially hydrogenating oils of this type. Those skilled in the art are familiar with such processes. Fish oils have, of course, been hydrogenated in the past, and soaps have been made from such hydrogenated oils. In these prior processes it has been more usual to substantially saturate the oil with hydrogen so that its unsaturated C18 fatty acids are converted to stearic acid. Occasionally the hydrogenation has stopped short of complete saturation but it has almost always been prolonged until the iodine number of the fish oil has been reduced to say 20. This gives a better oil for soaps, although the foaming properties are not very good. Sometimes, however, the fish oil is only partially hydrogenated, to between an iodine number of 40 and 60.

In our invention we do not saturate to the extent hitherto usually practised because we want our hydrogenated oils to be quite unsaturated so that we can hydroxylate them and still, in our most advantageous products, retain some degree of unsaturation. Hence, although we are hydrogenating the fish oils as a first step in our process, we are not hydrogenating as completely as has been commonly practised in the past. We stop our hydrogenation treatment when the iodine number of the oil has been reduced to between about 40 and 80. It will, of course, be understood by those skilled in the art that samples of the oil undergoing hydrogenation can be withdrawn from the hydrogenator from time to time for determination of the iodine number and the hydrogenation reaction terminated when a sample shows the desired iodine number.

Since the hydrogenation of the unsaturated fats is so well understood we shall not describe this step in our process in further detail. The partially hydrogenated oil is, of course, freed of the catalyst in the usual way.

We next saponify the partially hydrogenated fish oil, also in well known ways, in order to obtain the fatty acids thereof. In this step of our process we can Twitchellize the fat and thus recover the fatty acids as free fatty acids, or we can autoclave the fat, or we can treat the fat with alkalies such as caustic soda and recover the fatty acids as soaps. This step in our process is too well understood to require detailed description since it is common practise to saponify or split fats. The fact that our fats are still quite unsaturated does not necessitate any change in the ordinary hydrolytic treatment for the recovery of the fatty acids.

Having obtained the partially hydrogenated fish oil fatty acids, which will also have iodine numbers of about 40 to 80 depending upon the extent of hydrogenation of the fat, we then subject these unsaturated fatty acids to processes which will introduce hydroxyl groups into their molecules. It will, of course, be apparent that these unsaturated acids are mixtures of various fatty acids. The mixtures almost always contain fatty acids of uncertain structure but which have eighteen or more carbon atoms. Consequently the hydroxylated products which we obtain are also mixtures and are not individual fatty acids. Indeed many of the desirable properties of our products may be traced to the fact that the hydroxylated materials are mixtures rather than the pure compounds.

Various methods of hydroxylating the unsaturated fish oil fatty acids can be used but, as stated, we find it more satisfactory to use methods which we have developed and have described in great detail in our aforesaid Patent No. 2,033,538. In brief this method involves the addition of the fatty acid to an alkaline solution containing a small amount of a nickel salt and into which solution chlorine is passed. Under these conditions the chlorine first reacts with the alkali, such as NaOH, to form a hypochlorite, the hypochlorite then reacts with the nickel salt or oxide to form a nickel peroxide which, being unstable, breaks down to liberate free, active oxygen. This oxygen then reacts with, or adds to, the double bonds of the fatty acid to form an epioxide which then hydrates with the water to form a hydroxy compound. Of course these reactions are concurrent and their probable course is that just stated although we are not to be bound by the theoretical explanation given.

Thus, for example, we pass chlorine gas into a solution of 75 grams of potassium hydroxide, five grams of nickel nitrate and a half gram of manganous chloride, all disolved in 1000 grams of water, until the solution turns an inky black color. This takes about a half hour and indicates the formation of highly active nickel peroxide therein. We find that the manganous chloride facilitates the formation of the nickel peroxide materially and that is why we include it, but it can be omitted. To this inky solution we now add fifty grams of the partially hydrogenated fish oil fatty acids having an iodine number of about 40 to 80 and heat the solution under a reflux. The fatty acids are of course at once converted to potassium soaps and these soaps react with the nickel peroxide most probably in the manner stated above. We then pass more chlorine into the solution at the rate of about 10 cc. a minute for about 12 hours. The chlorine acts to form more hypochlorite which in turn reforms the nickel peroxide and this in turn "oxidizes" or hydroxylates more fatty acid. Introduction of chlorine is advantageously carried out while the solution is at a moderately elevated temperature, ordinarily about 90° C. But the extent of a hydroxylation can be controlled by the temperature, the time, and the quantity of chlorine introduced. Here again, samples of the reacting mixture can be withdrawn the soaps of the hydroxylated acids salted out, neutralized to liberate the free hydroxylated acid, and the acetyl number of the acid determined. The acetyl number, of course, indicates the degree of hydroxylation.

After the hydroxylation has been carried on to the extent desired we stop the introduction of chlorine and add a small amount of caustic soda and caustic potash to the reaction mixture. About ten grams is enough. The reaction mixture is then refluxed for a short time and thereafter filtered. The added alkali is for the purpose of converting any nickel and manganese salts present to their oxides which, being insoluble, can be filtered off and added to further quantities of reacting substances. The filtered solution is then treated with a salting-out salt, such as ordinary NaCl, the soap filtered and acidified with a dilute mineral acid to liberate the free hydroxylated fatty acid.

The extent of partial hydrogenation prior to hydroxylation, and the extent of hydroxylation is, of course, subject to much variation. We have described how these steps can be controlled. In the following table we give the iodine and acetyl values of several final products made by our invention.

| Iodine # original fish oil | Iodine # after hydrogenation | Iodine # after hydroxylation | Acetyl value |
|---|---|---|---|
| 147 | 78.8 | 44.8 | 48.2 |
| 147 | 78.8 | 16.8 | 62.8 |
| 147 | 78.8 | 0.0 | 112.0 |
| 147 | 61.9 | 3.3 | 82.0 |
| 147 | 43.7 | 8.2 | --- |
| 147 | 43.7 | 42.7 | 29.0 |

All of these fatty acids are solid or semi-solid, the melting point increasing as the acetyl value increases. The above tabulated data will indicate the considerable variation in extent of hydroxylation which is possible, and one of the products given has a zero iodine number after hydroxylation.

Of especial interest in the above table is the last product given. This has the same iodine number after hydroxylation as before and indicates that obscure reactions have occurred. Most probably one or more of the double bonds of the unsaturated fatty acid add on hydroxyl groups and then one of said hydroxyl groups reacts with a hydrogen on an adjacent carbon to split out water and restore the double bond. We find that this type of reaction is likely to happen at relatively high hydroxylation temperatures, and where the hydroxylation reaction is quite short. Thus, if we wish to just add OH groups we find it better to work at moderately elevated temperatures, from about 30° C. to 60° C., but here again, when the final product is unsaturated, we are inclined to believe that complete saturation by hydroxyl groups may have occurred followed by splitting out of water as described.

Curiously, we find that the best soap-forming hydroxylated acids are those which retain some unsaturation but nevertheless have significant acetyl values. Of all the hydroxylated fatty acids we have made, the very best soap-formers as regards sudsing and foaming are those which have undergone internal loss of water, as described above, to give products having iodine numbers about the same after as before hydroxylation.

It will, of course, be understood that all the hydroxylated acids of our invention can be converted to soaps by reaction with alkalies and used in detergent compositions etc.

The processes described above are susceptible to various modifications. Instead of hydrogenating the fish oil per se we can, of course, obtain the fatty acids thereof, subject these to hydrogenation in ways well known, and then hydroxylate the partially hydrogenated fatty acids. Or we can hydroxylate the partially hydrogenated fish oils instead of their fatty acids. But we find that the hydroxylation reaction is much smoother when fatty acids rather than the triglycerides are hydroxylated. This is probably because the fatty acids become soluble in the hydroxylation reaction mixture since they form soaps with the alkali whereas the triglycerides are insoluble, although they may in time saponify.

Likewise we do not wish to be restricted to any particular way of hydroxylating the fish oil fatty acids. That method described by us in our copending application is particularly well adapted for the treatment of the fish oil fatty acids. But we are aware that strong alkaline solutions of permanganates have been used to convert unsaturated fatty acids to hydroxylated derivatives and we know of no reason why such reagents cannot be made to work with our partially hydrogenated fish oil fatty acids. We are also aware that hydroxylated fatty acids have been made by syntheses forming chlorhydrins as intermediate products which are subsequently saponified to convert the chlorine thereof to hydroxyl groups. We see no reason why this method cannot be made to work on our materials.

All our final products are, as stated, derived from fish oils or fish oil fatty acids by hydrogenation and hydroxylation. We consequently broadly claim them in the appended claims as hydrogenated, hydroxylated fish oil fatty acids. No one, to our knowledge, has ever hydroxylated fatty acids from this source hitherto. One reason for this is that attempts to hydroxylate the fatty acids as such (without preliminary partial hydrogenation) have not resulted in the formation of hydroxyl derivatives. This is because of the ease with which the highly unsaturated acids oxidize and decompose.

Our products are also solid or semi-solid, and their melting points after hydroxylation correspond quite closely with the melting point of the partially hydrogenated fish oil prior to hydroxylation. This is a distinct advantage since we can regulate the melting point of the final product by the degree of hydrogenation.

Having thus described our invention what we claim is:

1. The process which comprises partially hydrogenating a fish oil material having an iodine number of at least 100 and being chosen from the group consisting of fish oil and the unsaturated fatty acids thereof until the iodine number is not more than about 80, and then hydroxylating the partially hydrogenated fish oil material.

2. The process which comprises partially hydrogenating a fish oil having an iodine number of at least 100 until the iodine number is not more than about 80 and then hydroxylating the partially hydrogenated fish oil material.

3. The process which comprises partially hydrogenating a fish oil having an iodine number of at least 100 until the iodine number is not more than 80, splitting the fish oil to obtain the fatty acids thereof and then hydroxylating said fatty acids.

4. The process which comprises partially hydrogenating a fish oil material having an iodine number of at least 100 and being chosen from the group consisting of fish oil and the unsaturated acids thereof until the iodine number is not more than about 80, and then incompletely hydroxylating the fish oil material.

5. The process which comprises partially hydrogenating a fish oil having an iodine number of at least 100 until the iodine number is not more than about 80, and then treating the fish oil with a hydroxylating agent but restricting the extent of hydroxylation so that the acid radicals of the oil are but partially hydroxylated.

6. The process which comprises partially hydrogenating a fish oil having an iodine number of at least 100 until the iodine number is not more than about 80, splitting the oil to obtain the fatty acids thereof, and then treating the fatty acids with a hydroxylating agent but restricting the extent of hydroxylation so that the final product is unsaturated, hydroxylated fish oil fatty acids.

7. The process which comprises partially hydrogenating a fish oil material having an iodine number of at least 100 until its iodine number has been reduced to between about 40 and 80, and then hydroxylating the fish oil material.

8. The process which comprises hydroxylating fish oil fatty acids obtained from a partially hydrogenated fish oil in which the iodine number thereof has been reduced to about 40 to 80.

9. The process which comprises partially hydrogenating a fish oil until its iodine number has been reduced to between 40 and 80, splitting the fish oil to obtain the fatty acids thereof, and hydroxylating said fatty acids.

10. The process which comprises partially hydroxylating fish oil fatty acids obtained from a partially hydrogenated fish oil in which the iodine number thereof has been reduced to about 40 to 80, said hydroxylation being restricted to give unsaturated, hydroxylated fish oil fatty acids.

11. As a new material hydrogenated, hydroxylated fish oil fatty acids having an acetyl number between about 29 and 112 and an iodine number between zero and about 45, the iodine number decreasing as the acetyl value increases.

12. As a new material hydroxylated fish oil fatty acids having an iodine number of about 42.7 and an acetyl number of about 29.

13. As a new material hydroxylated fish oil fatty acids obtained by reducing the iodine number of the fish oil fatty acids to not more than about 80 and then hydroxylating the acids.

ANDERSON W. RALSTON.
STEWART T. BAUER.